United States Patent
Bruckman et al.

(10) Patent No.: US 7,983,150 B2
(45) Date of Patent: Jul. 19, 2011

(54) VPLS FAILURE PROTECTION IN RING NETWORKS

(75) Inventors: Leon Bruckman, Petah Tikva (IL); Moran Roth, Tel-Aviv (IL); Ron Sdayoor, Ganei Tikva (IL)

(73) Assignee: Corrigent Systems Ltd., Tel Aviv (IL)

( * ) Notice: Subject to any disclaimer, the term of this patent is extended or adjusted under 35 U.S.C. 154(b) by 1174 days.

(21) Appl. No.: 11/335,770

(22) Filed: Jan. 18, 2006

(65) Prior Publication Data

US 2007/0165518 A1    Jul. 19, 2007

(51) Int. Cl.
*H04J 1/16*      (2006.01)
*H04L 12/28*    (2006.01)

(52) U.S. Cl. ........ 370/218; 370/225; 370/258; 370/403; 370/406

(58) Field of Classification Search .................. None
See application file for complete search history.

(56) References Cited

U.S. PATENT DOCUMENTS

| | | |
|---|---|---|
| 4,535,785 A | 8/1985 | van den Honert |
| 4,602,624 A | 7/1986 | Naples et al. |
| 4,628,942 A | 12/1986 | Sweeney et al. |
| 4,702,254 A | 10/1987 | Zabara |
| 4,867,164 A | 9/1989 | Zabara |
| 5,025,807 A | 6/1991 | Zabara |
| 5,159,595 A | 10/1992 | Flanagan et al. |
| 5,188,104 A | 2/1993 | Wernicke |
| 5,199,430 A | 4/1993 | Fang |
| 5,205,285 A | 4/1993 | Baker, Jr. |
| 5,215,086 A | 6/1993 | Terry, Jr. |
| 5,263,480 A | 11/1993 | Wernicke |
| 5,282,468 A | 2/1994 | Klepinski |
| 5,299,569 A | 4/1994 | Wernicke |
| 5,307,353 A | 4/1994 | Yamashita et al. |
| 5,321,393 A | 6/1994 | Carlton et al. |
| 5,335,657 A | 8/1994 | Terry, Jr. |
| 5,461,611 A | 10/1995 | Drake et al. |
| 5,540,730 A | 7/1996 | Terry, Jr. |
| 5,571,150 A | 11/1996 | Wernicke |
| 5,581,703 A | 12/1996 | Baugher et al. |

(Continued)

OTHER PUBLICATIONS

Martini, et al. "Encapsulation Methods for Transport of Ethernet Frames Over IP/MPLS Networks." IETF Draft, May 2001, Available at: search.ietf.org/internet-drafts/draft-martini-12circuit-encap-mpls-02.txt.

(Continued)

*Primary Examiner* — Melanie Jagannathan
(74) *Attorney, Agent, or Firm* — Peter A. Nieves; Sheehan Phinney Bass+ PA

(57) ABSTRACT

A method for communication over a bi-directional ring network includes provisioning a virtual private local area network service (VPLS) over the bi-directional ring network. The VPLS includes connection termination points provisioned respectively on a plurality of the nodes so as to connect each of the plurality of the nodes to a second network external to the ring network. As long as the nodes and spans are fully operational, one or more of the connection termination points are maintained in a deactivated state, so that no more than one of the connection termination points to the second network is active. The nodes exchange messages indicative of a failure associated with the bi-directional ring network, causing at least one of the deactivated connection termination points to be activated so as to maintain connectivity among the users of the VPLS without creating a loop in the VPLS via the second network.

20 Claims, 5 Drawing Sheets

FIG. 1

U.S. PATENT DOCUMENTS

| | | | |
|---|---|---|---|
| 5,596,569 A | 1/1997 | Madonna et al. | |
| 5,638,358 A | 6/1997 | Hagi et al. | |
| 5,706,516 A | 1/1998 | Chang et al. | |
| 5,707,400 A | 1/1998 | Terry, Jr. | |
| 5,755,750 A | 5/1998 | Petruska | |
| 5,925,137 A | 7/1999 | Okanoue et al. | |
| 5,983,360 A | 11/1999 | Ugajin et al. | |
| 6,021,263 A | 2/2000 | Kujoory et al. | |
| 6,032,194 A | 2/2000 | Gai et al. | |
| 6,205,359 B1 | 3/2001 | Boveja | |
| 6,205,488 B1 | 3/2001 | Casey et al. | |
| 6,233,073 B1 | 5/2001 | Bowers et al. | |
| 6,246,667 B1 | 6/2001 | Ballantine et al. | |
| 6,256,292 B1 | 7/2001 | Ellis et al. | |
| 6,262,976 B1 | 7/2001 | McNamara | |
| 6,275,493 B1 | 8/2001 | Morris et al. | |
| 6,304,575 B1 | 10/2001 | Carroll et al. | |
| 6,314,110 B1 | 11/2001 | Chin et al. | |
| 6,330,229 B1 | 12/2001 | Jain et al. | |
| 6,339,488 B1 | 1/2002 | Beshai et al. | |
| 6,339,595 B1 | 1/2002 | Rekhter et al. | |
| 6,359,858 B1 | 3/2002 | Smith et al. | |
| 6,366,556 B1 | 4/2002 | Ballintine et al. | |
| 6,370,121 B1 | 4/2002 | Hausman | |
| 6,400,681 B1 | 6/2002 | Bertin et al. | |
| 6,408,001 B1 | 6/2002 | Chuah et al. | |
| 6,442,134 B1 | 8/2002 | Mitchell | |
| 6,446,131 B1 | 9/2002 | Khansari et al. | |
| 6,456,407 B1 | 9/2002 | Tammela et al. | |
| 6,456,587 B2 | 9/2002 | Taniguchi | |
| 6,466,985 B1 | 10/2002 | Goyal et al. | |
| 6,563,793 B1 | 5/2003 | Golden et al. | |
| 6,584,535 B1 | 6/2003 | Ouellet et al. | |
| 6,604,136 B1 | 8/2003 | Chang et al. | |
| 6,628,624 B1 | 9/2003 | Mahajan et al. | |
| 6,636,478 B1 | 10/2003 | Sensel et al. | |
| 6,639,893 B1 | 10/2003 | Chikenji et al. | |
| 6,639,896 B1 | 10/2003 | Goode et al. | |
| 6,647,008 B1 | 11/2003 | Galand et al. | |
| 6,678,241 B1 | 1/2004 | Gai et al. | |
| 6,680,906 B1 | 1/2004 | Nguyen | |
| 6,680,912 B1 | 1/2004 | Kalman et al. | |
| 6,690,644 B1 * | 2/2004 | Gorshe | 370/219 |
| 6,711,125 B1 | 3/2004 | Walrand et al. | |
| 6,724,880 B1 | 4/2004 | Lynch | |
| 6,731,597 B1 | 5/2004 | Batchellor et al. | |
| 6,741,553 B1 * | 5/2004 | Grenier | 370/218 |
| 6,757,286 B1 | 6/2004 | Stone | |
| 6,760,775 B1 | 7/2004 | Anerousis et al. | |
| 6,765,921 B1 | 7/2004 | Stacey et al. | |
| 6,778,496 B1 | 8/2004 | Meempat et al. | |
| 6,795,394 B1 | 9/2004 | Swinkels et al. | |
| 6,801,506 B1 | 10/2004 | Dey | |
| 6,807,172 B1 | 10/2004 | Levenson et al. | |
| 6,820,210 B1 | 11/2004 | Daruwalla et al. | |
| 6,826,158 B2 | 11/2004 | Seaman et al. | |
| 6,829,651 B1 | 12/2004 | Bass et al. | |
| 6,831,932 B1 | 12/2004 | Boyle et al. | |
| 6,879,559 B1 | 4/2005 | Blackmon et al. | |
| 6,879,594 B1 | 4/2005 | Lee et al. | |
| 6,886,043 B1 | 4/2005 | Mauger et al. | |
| 6,922,394 B2 | 7/2005 | Kajiwara et al. | |
| 6,925,054 B1 | 8/2005 | Atterton et al. | |
| 6,934,259 B2 | 8/2005 | Klincewicz et al. | |
| 6,985,447 B2 | 1/2006 | Gibson et al. | |
| 7,009,974 B1 | 3/2006 | Fotedar | |
| 7,035,279 B2 | 4/2006 | Bruckman et al. | |
| 7,102,995 B2 * | 9/2006 | Gonda | 370/224 |
| 7,212,490 B1 | 5/2007 | Kao et al. | |
| 7,242,664 B2 * | 7/2007 | Einstein et al. | 370/216 |
| 7,382,789 B2 * | 6/2008 | Yu | 370/401 |
| 7,433,671 B2 * | 10/2008 | Kailbach et al. | 455/403 |
| 2001/0022786 A1 | 9/2001 | King et al. | |
| 2001/0033575 A1 | 10/2001 | Shimamura et al. | |
| 2002/0015411 A1 | 2/2002 | Kataoka et al. | |
| 2002/0018482 A1 | 2/2002 | Gotzer | |
| 2002/0024974 A1 | 2/2002 | Karagiannis et al. | |
| 2002/0093949 A1 | 7/2002 | Yasue et al. | |
| 2002/0118700 A1 | 8/2002 | Bruckman | |
| 2002/0176371 A1 | 11/2002 | Behzadi | |
| 2002/0176450 A1 | 11/2002 | Kong et al. | |
| 2002/0179720 A1 | 12/2002 | Liva et al. | |
| 2003/0002443 A1 | 1/2003 | Basso et al. | |
| 2003/0009594 A1 | 1/2003 | McElligott | |
| 2003/0012129 A1 * | 1/2003 | Lee et al. | 370/216 |
| 2003/0021226 A1 | 1/2003 | Mor | |
| 2003/0026298 A1 | 2/2003 | Bisson et al. | |
| 2003/0061338 A1 | 3/2003 | Stelliga | |
| 2003/0074469 A1 | 4/2003 | Busi et al. | |
| 2003/0088698 A1 | 5/2003 | Singh et al. | |
| 2003/0147344 A1 | 8/2003 | Stewart et al. | |
| 2003/0147345 A1 | 8/2003 | Takagi et al. | |
| 2003/0154315 A1 | 8/2003 | Sultan et al. | |
| 2003/0196135 A1 | 10/2003 | Gottlieb | |
| 2004/0022268 A1 | 2/2004 | Busi et al. | |
| 2004/0071089 A1 | 4/2004 | Bauer et al. | |
| 2004/0101303 A1 | 5/2004 | Williams | |
| 2004/0170184 A1 | 9/2004 | Hashimoto | |
| 2004/0179472 A1 | 9/2004 | Khalilzadeh et al. | |
| 2004/0202171 A1 | 10/2004 | Hama | |
| 2005/0135436 A1 | 6/2005 | Nigam et al. | |
| 2005/0226265 A1 | 10/2005 | Takatori | |
| 2005/0271035 A1 * | 12/2005 | Cohen et al. | 370/351 |

OTHER PUBLICATIONS

Rosen, et al. "MPLS Label Stack Encoding." Request for Comments (RFC) 3032 of the Internet Engineering Task Force (IETF), Jan. 2001.

Awduche, et al. "Requirement for Traffic Engineering Over MPLS," published as IETF RFC 2702, Sep. 1999.

Deering, S., "Host Extensions for IP Multicasting," RFC 1112, Aug. 1989.

Lasserre, et al. "Virtual Private LAN Services Over MPLS draft-ietf-l2vpn-vpls-ldp-03.txt," Internet Draft Document—Provider Provisioned VPN Working Group, Jun. 2002 & Jan. 2003.

"SONET Bidirectional Line-Switched Ring Equipment Generic Criteria," A Module of TSGR, FR-440, GR-1230-CORE by Bellcore, Issue 4, Dec. 1998.

Baker, et al. "PPP Bridging Control Protocol (BCP)," in IETF RFC 1638, Jun. 1994.

Bradley, et al., "Multiprotocol Interconnect Over Frame Relay," in IETF RFC 1490, Jul. 1993.

Kompella, et al., "Virtual Private LAN Service," IETF draft-ietf-l2vpn-vpls-bgp-02.txt, May 2004.

IEEE Standard 802.17, "Part 17: Resilient Packet Ring (RPR) Access Method & Physical Layer Specifications," RPR Alliance 2002, 2003.

Orave, F., "Scaling RPR with Multiple Rings: One Control Plane Multiple Transit Paths," Presented at the IEEE 802.17 working group meeting, Portland, OR, Jul. 10, 2001.

* cited by examiner

VPLS FAILURE PROTECTION IN RING NETWORKS

CROSS-REFERENCE TO RELATED APPLICATION

This application is related to U.S. patent application Ser. No. 10/993,882, filed Nov. 19, 2004, which is assigned to the assignee of the present patent application and whose disclosure is incorporated herein by reference.

FIELD OF THE INVENTION

The present invention relates generally to communication networks, and specifically to methods and systems for providing virtual private LAN services (VPLS).

BACKGROUND OF THE INVENTION

Bi-directional network ring topologies are gaining in popularity, particularly in Internet Protocol (IP) networks. Such networks provide efficient bandwidth utilization by enabling data to be transferred between any pair of nodes in either direction around the ring, while maintaining fast protection against faults. The two opposing traffic directions are commonly referred to as an inner ringlet and an outer ringlet, or ringlet 0 and ringlet 1. It will be understood, however, that in the context of the present patent application and in the claims, the terms "inner" and "outer," as well as other terms such as "east" and "west" or "right" and "left," are used arbitrarily to distinguish between the two opposing directions of packet flow in a ring network. These terms are chosen solely for convenience of explanation, and do not necessarily bear any relation to the physical characteristics of the network.

The leading bi-directional protocol for high-speed packet rings is the Resilient Packet Ring (RPR) protocol, which has been approved as IEEE standard 802.17, "Part 17: Resilient Packet Ring (RPR) Access Method & Physical Layer Specifications," which is incorporated herein by reference. Using the RPR protocol, each node (commonly referred to as a "station") in a ring network has a RPR Medium Access Control (MAC) address and can communicate directly with all other nodes through either ringlet. Each packet sent over either of the ringlets carries a header indicating its RPR MAC destination address. The receiving node recognizes its address in the header and strips the packet from the ring. All other nodes pass the packet onward transparently around the ring.

Nodes in a RPR network use a topology discovery mechanism (described in Chapter 10 and Annex K of the standard) to automatically keep track of the topology of the ring. Topology messages are broadcast from each node to the other nodes on the ring. Each node constructs a topology map, containing information about the location, capabilities, and "health" of other nodes on the ring. Topology messages are generated periodically and upon the detection of changes in local status. When a node is removed or a fiber span between nodes fails, the nodes adjacent to the failure record the status in their topology maps and send protection messages around the ring. All the nodes update their topology maps to reflect the change in connectivity.

The RPR standard (Annex E) also defines a mechanism for bridging between 802.1D and 802.1Q LANs via the ring network. Bridging of this sort is carried out by bridge nodes on the ring, which connect the ring to other LANs. When a bridge node receives a packet from another LAN, it adds a RPR header with an appropriate RPR MAC destination address and forwards the packet across the ring. If the particular RPR MAC address for the packet is unknown, the bridge node uses a broadcast MAC address to flood the packet to all the nodes on the ring.

Busi et al. describe methods for making transparent local area network (LAN) connections over a RPR network in U.S. Patent Application Publications US 2003/0074469 A1 and US 2004/0022268 A1, whose disclosures are incorporated herein by reference. A transparent LAN service (better known as a Virtual Private LAN service—VPLS) provides bridge-like functionality between multiple sites over a large network.

General methods for creating a VPLS, not specifically related to the RPR context, are described by Kompella et al., in "Virtual Private LAN Service" (May, 2004) and by Lasserre et al., in "Virtual Private LAN Services over MPLS" (April, 2004), which are incorporated herein by reference. Users connect to the VPLS via regular Ethernet interfaces. The VPLS entity itself is formed by virtual connections (referred to as "Pseudo-Wires," or PWs) between the nodes to which the users are connected.

Every node in a VPLS acts as a virtual bridge. A virtual bridge node has "virtual ports," which are the endpoints of PWs that are part of the VPLS. The interfaces to which the users are actually connected are physical ports at the network edges. Both virtual and real interfaces are treated identically from the point of view of frame forwarding and MAC address learning. A single provider node can participate in multiple VPLS instances, each belonging to different users. From the perspective of the end-user, the VPLS network is transparent. The user is provided with the illusion that the provider network is a single LAN domain. User nodes on different physical LANs can thus be joined together through VPLS connections to define a virtual private network (VPN), which appears to the users to be a single Ethernet LAN.

SUMMARY OF THE INVENTION

Although bi-directional ring networks, such as RPR networks, have built-in failure protection mechanisms, these mechanisms do not adequately protect against all failure scenarios that may occur in a VPLS that is provisioned over the ring. For example, if multiple failures occur concurrently, some of the nodes in the ring may be isolated from other nodes, leading to segmentation of the VPLS. As another example, if the VPLS is provisioned across both the ring and another network connected to the ring, a failure in the connection between the ring and the other network may similarly lead to VPLS segmentation. Users in one segment of the VPLS will then find that they are unable to communicate with users in other segments.

Embodiments of the present invention provide failure protection mechanisms that can respond to and overcome these sorts of VPLS failure scenarios quickly and efficiently. In these embodiments, one or more standby connection termination points (CTPs) are defined as part of the VPLS at one or more of the nodes in the ring network. Each CTP connects the respective node to a network external to the ring network. In the absence of a network failure, these standby CTPs are blocked. When a failure occurs, the nodes in the ring network exchange topology messages and inform one another of the failure. Based on these messages, the nodes may determine that the VPLS has been segmented. In this case, the nodes choose one or more of the standby CTPs to be activated in order to overcome the segmentation.

This protection mechanism may be implemented individually in each VPLS that is provisioned on the ring network. It takes advantage of the built-in topology discovery mechanism that operates at the physical ring level to provide fast protection at the virtual LAN level. The use of standby CTPs in this manner, with well-defined criteria for determining which nodes should activate their CTPs and when, also avoids formation of loops that could arise in the VPLS topology due to the existence of multiple paths external to the ring network.

Although the embodiments described herein refer to particular standards (such as RPR) and use particular terminology (particularly VPLS terminology) to refer to virtual private networks, these standards and terminology are used solely for the sake of convenience and clarity. The principles of the present invention may similarly be applied in provisioning and protection of substantially any type of virtual private network over bi-directional packet rings of any suitable type.

There is therefore provided, in accordance with an embodiment of the present invention, a method for communication over a bi-directional ring network that includes nodes connected by spans of the ring network, the method including:

provisioning a virtual private local area network service (VPLS) to serve users over the bi-directional ring network, the VPLS including connection termination points provisioned respectively on a plurality of the nodes so as to connect each of the plurality of the nodes to a second network external to the ring network;

as long as the nodes and spans are fully operational, maintaining one or more of the connection termination points in a deactivated state, so that no more than one of the connection termination points to the second network is active;

exchanging messages among the nodes indicative of a failure associated with the bi-directional ring network; and responsively to the messages, activating at least one of the deactivated connection termination points so as to maintain connectivity among the users of the VPLS without creating a loop in the VPLS via the second network.

In a disclosed embodiment, the bi-directional ring network includes a resilient packet ring (RPR) network, and wherein exchanging the messages includes transmitting and receiving RPR topology messages.

Typically, the connection termination points are provisioned as virtual users of the VPLS. In some embodiments, provisioning the VPLS includes provisioning multiple VPLS instances over the bi-directional ring network, each of the VPLS instances including respective connection termination points, and activating the at least one of the deactivated connection termination points includes activating the respective connection termination points in each of the VPLS instances that is affected by the failure.

In one aspect of the invention, exchanging the messages includes determining that the ring network has become segmented into at least first and second separate segments, and activating the at least one of the deactivated connection termination points includes activating one or more of the deactivated connection termination points so that at least one of the connection termination points is active in each of the first and second segments, whereby both of the first and second segments are connected to the second network. In one embodiment, activating the one or more of the deactivated connection termination points includes activating first and second connection termination points in the first and second segments, respectively, so as to connect the first and second segments via a path through the second network.

In another aspect of the invention, provisioning the VPLS includes designating a node in the bi-directional ring network to serve as a hub, and activating a connection termination point of the designated node to connect the VPLS on the nodes of the ring network to the second network as long as the nodes and spans are fully operational, and exchanging the messages includes detecting and reporting on a failure of the activated connection termination point of the designated node, and wherein activating the at least one of the deactivated connection termination points includes activating one of the deactivated connection termination points of another node in the ring network so that the other node serves as the hub connecting the VPLS on the nodes of the ring network to the second network.

In a disclosed embodiment, activating the at least one of the deactivated connection termination points includes assigning respective priorities to the nodes, and choosing which of the connection termination points to activate responsively to the priorities. Alternatively or additionally, activating the at least one of the deactivated connection termination points includes determining, based on the messages, a topology of the ring network subject to the failure, and choosing which of the connection termination points to activate responsively to the topology.

In some embodiments, the method includes exchanging further messages indicative that the failure has been rectified, and responsively to the further messages, deactivating the at least one of the connection termination points that had activated responsively to the messages that were indicative of the failure.

There is also provided, in accordance with an embodiment of the present invention, a system for communication, including nodes connected by spans so as to define a bi-directional ring network, over which a virtual private local area network service (VPLS) is provisioned to serve users, the VPLS including connection termination points provisioned respectively on a plurality of the nodes so as to connect each of the plurality of the nodes to a second network external to the ring network, wherein as long as the nodes and spans are fully operational, one or more of the connection termination points are maintained in a deactivated state, so that no more than one of the connection termination points to the second network is active, and wherein the nodes are arranged to exchange messages indicative of a failure associated with the bi-directional ring network, and responsively to the messages, to activate at least one of the deactivated connection termination points so as to maintain connectivity among the users of the VPLS without creating a loop in the VPLS via the second network.

The present invention will be more fully understood from the following detailed description of the embodiments thereof, taken together with the drawings in which:

DETAILED DESCRIPTION OF EMBODIMENTS

Figure 1:
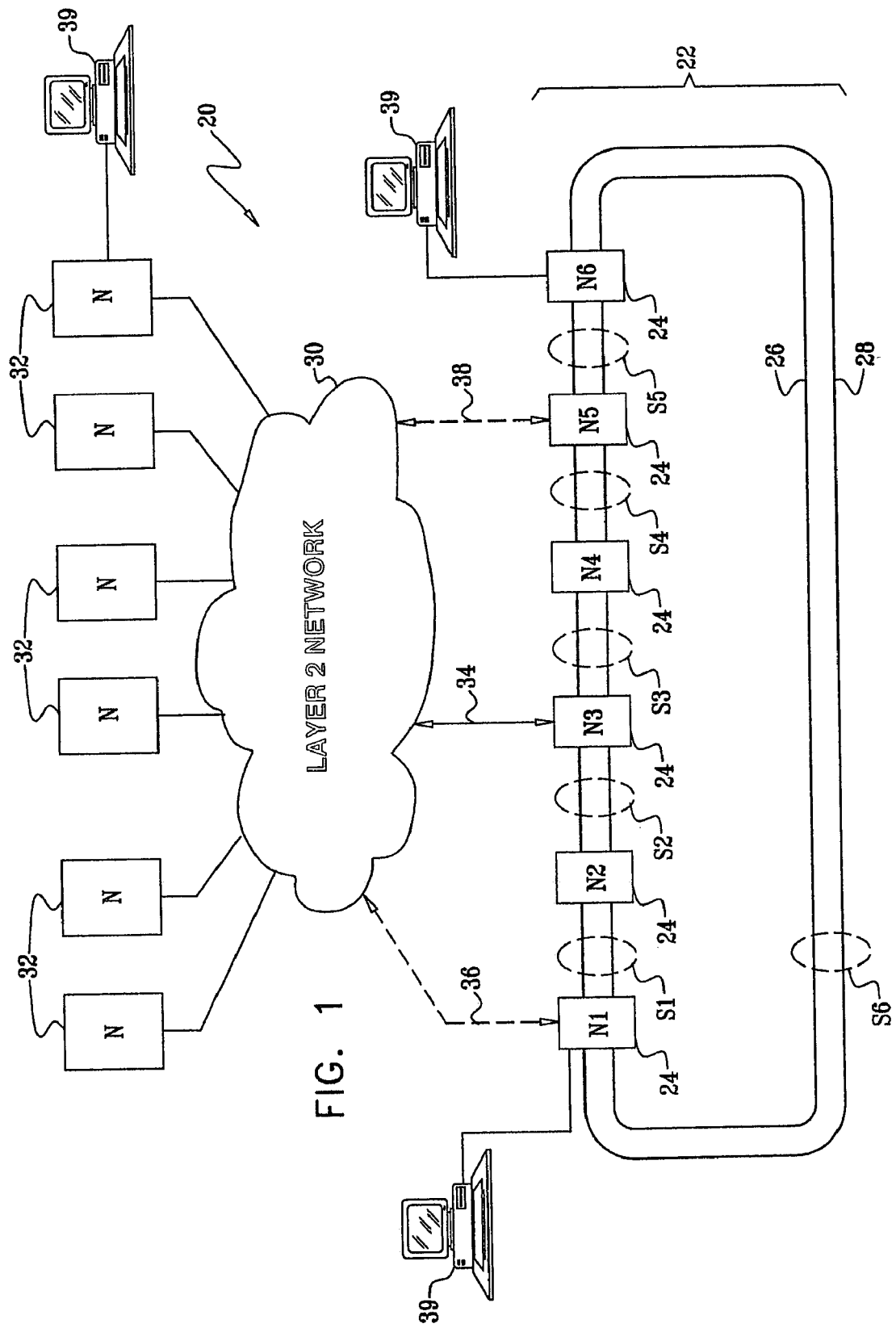
FIG. 1 is a block diagram that schematically illustrates a communication network supporting a VPLS, in accordance with an embodiment of the present invention.

FIG. 1 is a block diagram that schematically illustrates a communication network 20, in accordance with an embodiment of the present invention. Network 20 comprises a RPR network 22, which comprises nodes 24 (also referred to as "stations") connected by an inner ringlet 26 and an outer ringlet 28. For convenience, the nodes are labeled N1 through N6, and the spans of the ring connecting the nodes are labeled S1 through S6, as shown in the figure.

Two or more of nodes 24 are linked by respective connections 34, 36, 38 to a network 30 that is external to ring 22. Network 30 may comprise, for example, another RPR network. Alternatively, network 30 may comprise substantially any other type of network with Layer 2 bridging functionality, such as an Ethernet LAN or a system of label-switched tunnels through an IP network. At the simplest level, network 30 may comprise a single Layer 2 switch, which serves as a MAC bridge between connections 34, 36 and 38. Under normal operating conditions, however, no more than one of these connections (for example, connection 34) is active in each VPLS, in order to avoid creation of loops in the VPLS.

A VPLS is provisioned on ring network 22 between user terminals 39 that are connected to one or more of nodes 24. (In practical implementations, the user terminals typically connect to nodes 24 via LANs and switches that are external to the ring network, but these elements are omitted from the figure for the sake of simplicity.) The same VPLS may also be provisioned across other portions of network 20, so as to serve user terminals connected to nodes 32 of network 30, for example. Although only a single VPLS instance will be considered in the description that follows, multiple VPLS instances may be provisioned on network 22, each with its own topology and set of users. The methods of failure protection that are described hereinbelow may be applied to each of the VPLS instances individually.

Figure 2:
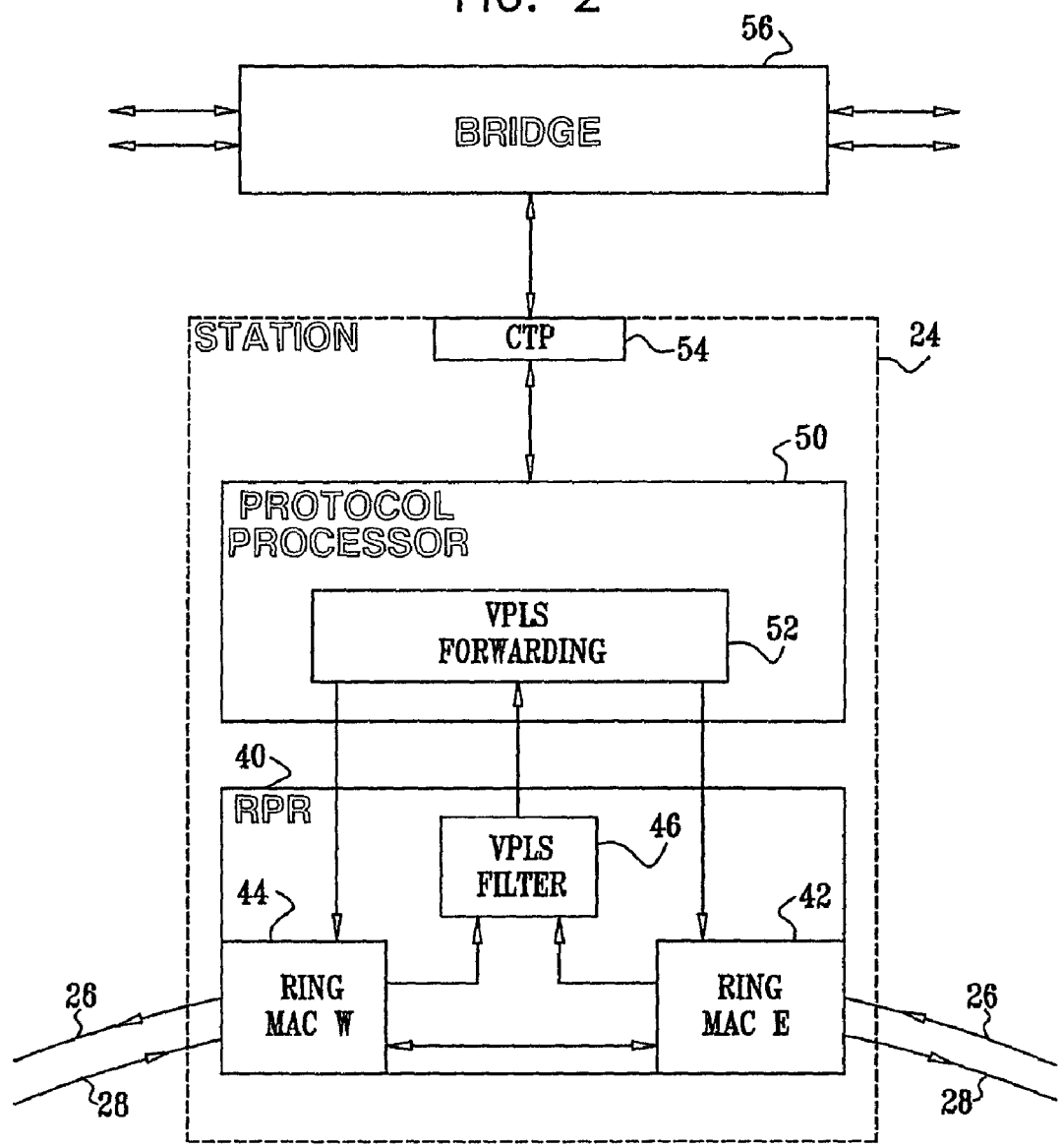
FIG. 2 is a block diagram that schematically shows details of a RPR network node, in accordance with an embodiment of the present invention.

FIG. 2 is a block diagram that schematically shows details of one of nodes 24 on ring network 22, in accordance with an embodiment of the present invention. The node shown in FIG. 2 is assumed to be a bridge node, which is connected to external network 30. The figure is simplified to show only the elements of the node that are significant in the context of VPLS processing and protection. The blocks shown in the figure and described hereinbelow represent functional elements of node 24 and do not necessarily reflect the actual physical structure of the node circuitry. The functional elements may be implemented in dedicated hardware logic or in software running on a programmable processor or in a combination of hardware and software components, as will be apparent to those skilled in the art.

Node 24 comprises a RPR MAC processor 40, which performs filtering and forwarding of RPR packets on the ring. Processor 40 comprises "east" and "west" ring interfaces 42 and 44, which connect to the neighboring spans of the ring network and perform physical layer and MAC processing functions mandated by the 802.17 standard. Optionally, a VPLS filter 46 handles broadcast and multicast traffic received from ring network 22 in order to enhance the efficiency of MAC processor 40. The VPLS filter, as well as other elements of node 24, are described in greater detail in the above-mentioned U.S. patent application Ser. No. 10/993,882.

When MAC processor 40 determines that a given packet should be processed by this node 24 (and not simply forwarded around the ring), it passes the packet directly to a protocol processor 50. Processor 50 performs higher-level processing functions with respect to packets transmitted from ring network 22 to other parts of network 20, and vice versa. When a RPR packet encapsulates a VPLS frame, a VPLS forwarding engine 52 looks past the RPR header and processes the underlying VPLS frame. Processor 50 then passes these frames via a port, referred to herein as a connection termination point (CTP) 54, to a bridge 56 in network 30. Bridge 56 may comprise a physical Ethernet switch, or it may be implemented as a virtual bridging function of another network element or set of elements that are configured to emulate a Layer 2 network. CTP 54 may comprise a physical port or a virtual port (such as a VLAN port, as defined in IEEE standard 802.1Q). Engine 52 similarly processes PW frames received from bridge 56 for transmission over ring network 22 and performs other VPLS forwarding functions that are described in the above-mentioned U.S. patent application Ser. No. 10/993,882.

Figure 3:
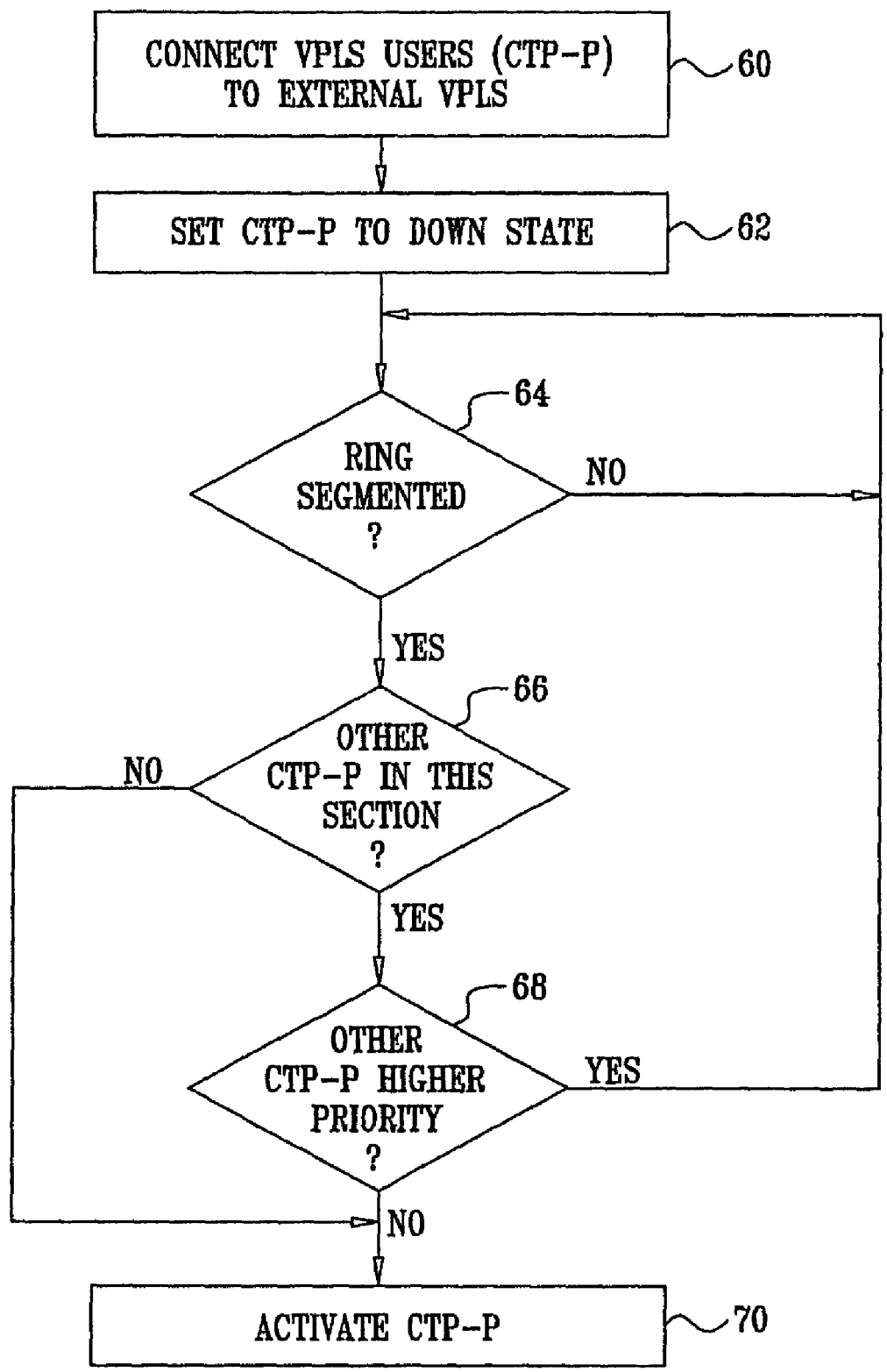
FIG. 3 is a flow chart that schematically illustrates a method for protection against segmentation of a VPLS, in accordance with an embodiment of the present invention.
Figure 4:
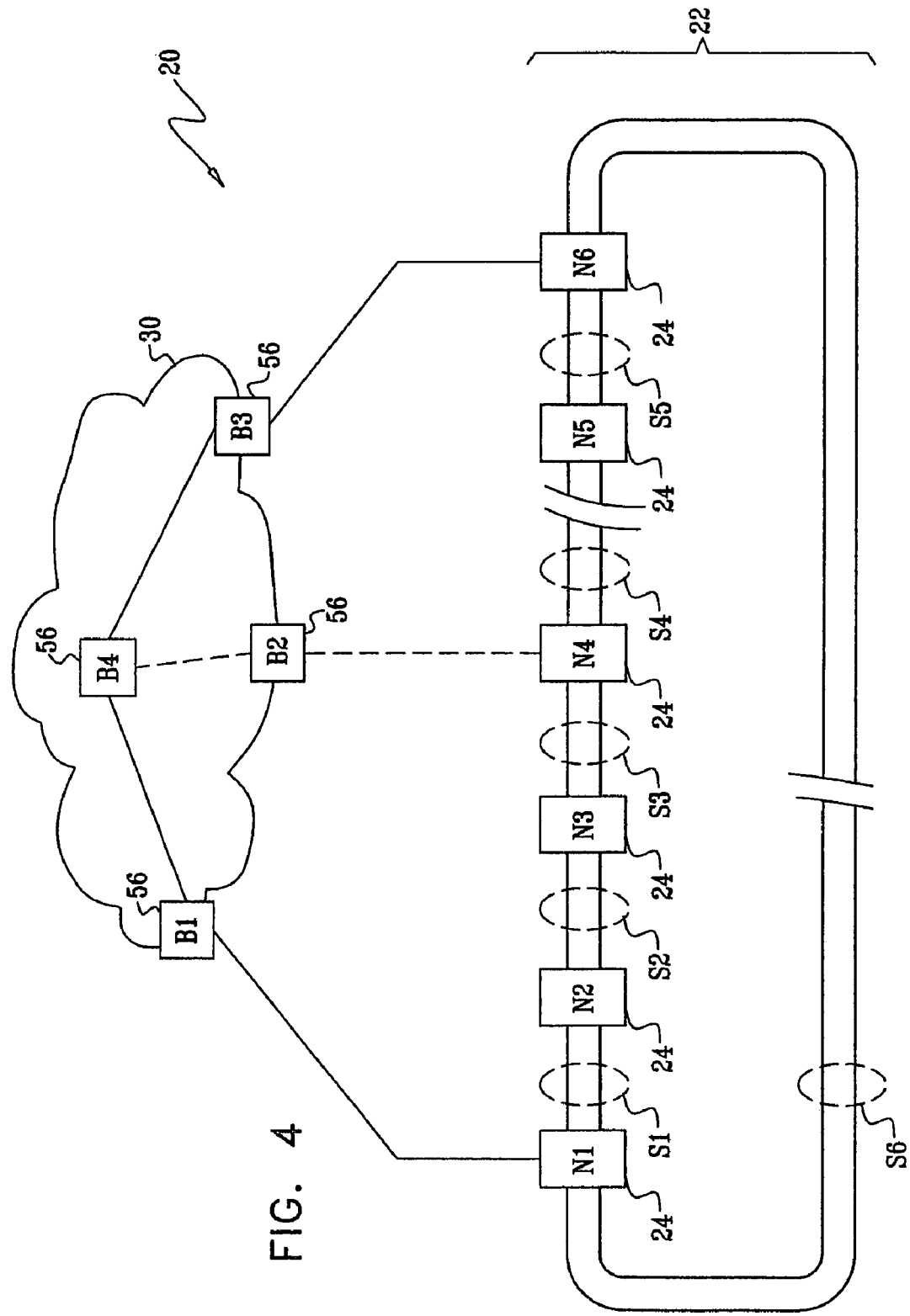
FIG. 4 is a block diagram that schematically illustrates a protection configuration of a VPLS, in accordance with an embodiment of the present invention.

Reference is now made to FIGS. 3 and 4, which schematically illustrate a method for protection of a VPLS in network 20 against segmentation of ring network 22, in accordance with an embodiment of the present invention. FIG. 3 is a flow chart that shows the steps in the method, while FIG. 4 is a block diagram showing elements of networks 22 and 30 that are involved in implementation of the method. As noted earlier, although this method is described hereinbelow with reference to a single VPLS, it may be carried out with respect to each separate VPLS instance that is provisioned on network 20.

Initially, as part of the provisioning of the VPLS, a protection CTP (referred to hereinafter as a CTP-P) is defined on each of two or more nodes 24 in ring network 22 that serve the VPLS, at a CTP-P connection step 60. Each CTP-P can also be viewed as a virtual user port, which connects the respective node 24 to a portion of the VPLS in external network 30. A CTP-P of this sort could be defined on every node 24 that serves the VPLS. In the example shown in FIG. 4, however, nodes N1, N4 and N6 are each connected by a respective CTP-P to a respective bridge 56 in network 30. As noted above, each CTP-P may be either a physical port or a virtual port. Each node 24 is informed as to which other nodes include a CTP-P for each VPLS. This information may be distributed to the nodes either as part of the provisioning process or by exchange of messages among the nodes.

During normal operation, as long as ring network 22 is not segmented, the CTP-Ps are set to the "down" state, at an initial CTP-P setting step 62. In this state, the CTP-P is blocked, so that no packets are forwarded through it. If the CTP-Ps were not blocked in this manner, a looped path could be formed in the VPLS via network 30. Although the Spanning Tree Protocol (STP) could be used to prevent this sort of loop, STP is not well accepted in wide area networks, and its use in the context of VPLS is not standardized. The present method provides rapid protection against network segmentation without requiring that an additional loop-prevention protocol, such as STP, be carried out.

Nodes 24 continually exchange topology messages, as mandated by the 802.17 standard. These messages enable the nodes to detect failures in ring network 22 and to reroute packets as necessary when a failure occurs. The nodes evaluate the messages in order to determine whether the ring network has become segmented, at a segmentation detection step 64. When only a single span of the ring fails, the nodes can wrap or steer packets around the ring, as appropriate, in order to maintain service on the VPLS. When two or more spans fail, however, the ring becomes segmented, and VPLS users connected to one segment may no longer be able to communicate with those connected to the other segment. This situation is illustrated in FIG. 4, in which spans S4 and S6 have been broken, thus isolating nodes N5 and N6 from the remaining nodes in the ring.

Upon determining that the ring has been segmented, each node having a CTP-P in a given VPLS checks to determine whether any of the other nodes in its own segment of the ring also has a CTP-P in this VPLS, at a protection checking step 66. At this step, for example, node N6 determines that it has the sole CTP-P in its segment of network 22. Node N6 then activates its CTP-P, at an activation step 70, thus activating the connection between its segment of the ring network and bridge B3 in network 30. There is no need, however (at this step or at any other step in the methods described herein) for any changes to be made in network 30 when CTPs are activated or deactivated. The protection protocol is carried out entirely by nodes 24 in ring network 22.

On the other hand, at step 66, nodes N1 and N4 each determine that in their own segment, there are two nodes that have a CTP-P. If both of nodes N1 and N4 were to activate their respective CTP-Ps at this point, a loop would be created in the VPLS through network 30 (via bridges B1, B4 and B2, as shown in FIG. 4). To avoid this sort of situation, only one of nodes N1 and N4 should activate its CTP-P, while the CTP-P of the other node remains blocked. For this purpose, each node has a predetermined protection priority. The priority can be set by the network service provider, or it may be determined by the nodes automatically, based on which node has the lowest IP address, for example. Each of nodes N1 and N4 determines which CTP-P node in the segment has a higher priority, at a priority checking step 68. In the example shown in FIG. 4, node N1 is assumed to have the higher priority. Therefore, only node N1 activates its CTP-P at step 70, and the two segments of ring network 22 are connected via bridges B1, B4 and B3.

Thus, the mechanism of FIG. 3 can provide protection against an arbitrary number of failures in the ring network, as long as there is at least one node with a CTP-P in each ring segment following the failure. When the ring recovers from the failure, the nodes exchange topology messages to inform one another that the segmentation of the ring has been resolved. The nodes immediately disable their CTP-Ps in order to avoid loop creation.

Figure 5:
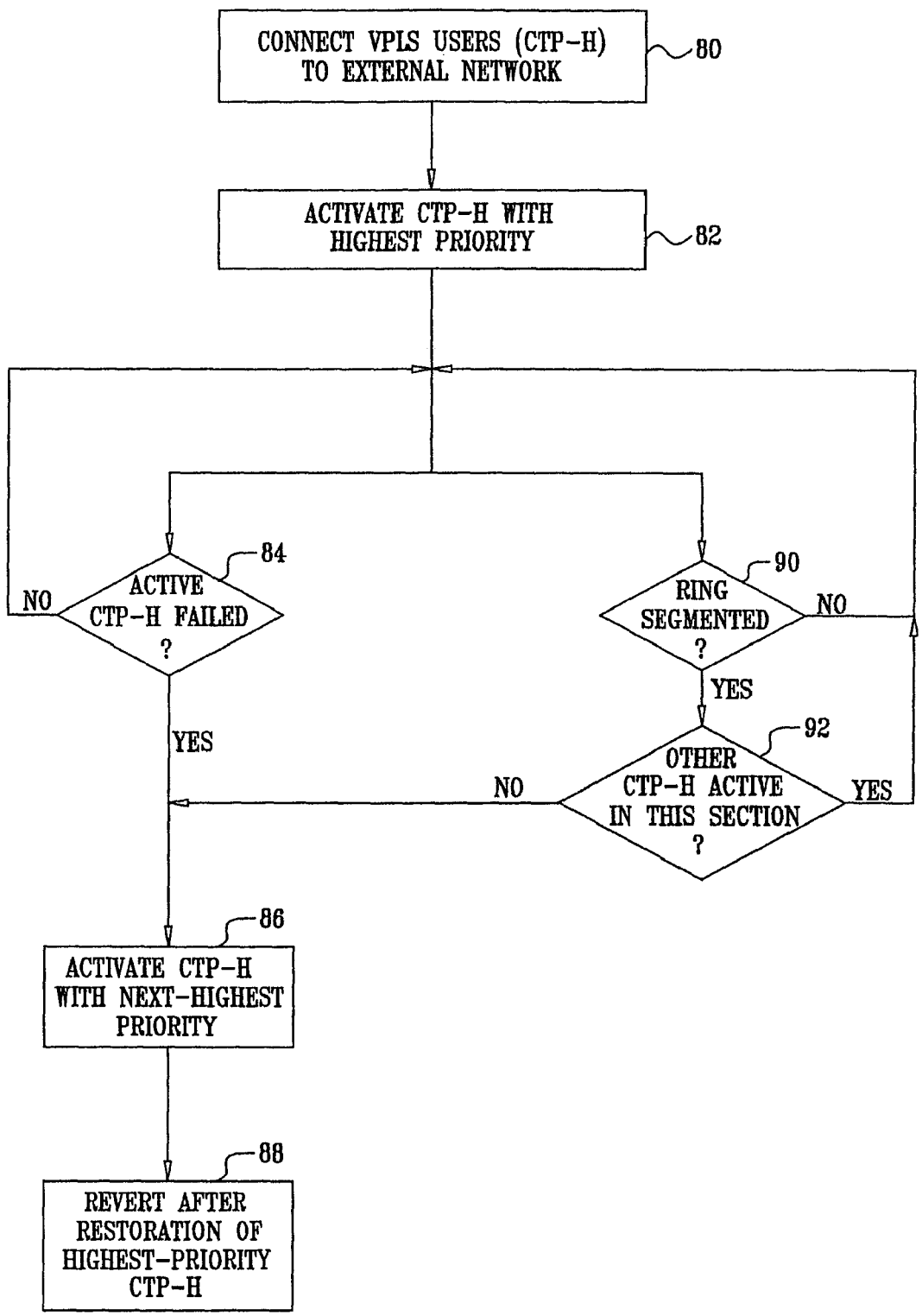
FIG. 5 is a flow chart that schematically illustrates a method for protection against segmentation of a VPLS, in accordance with another embodiment of the present invention.

FIG. 5 is a flow chart that schematically illustrates a method for protection of a VPLS provisioned across ring network 22 and external network 30 against loss of connection between the nodes in the two networks, in accordance with an embodiment of the present invention. This method is described hereinbelow with reference to the network configuration shown in FIG. 1. This method protects against two types of failures that may cut off the VPLS connection between nodes 24 in the ring network and nodes 32 on the external network:

Loss of the connection to network 30, due either to failure of node N3 or failure of connection 34.

Segmentation of ring network 22 (as shown in FIG. 4, for example), leading to isolation of one or more of nodes 24 from node N3.

The method of FIG. 5 (like the method of FIG. 3) begins with provisioning of virtual VPLS users, in the form of hub CTPs (CTP-H), which connect nodes 24 in ring network 22 to external network 30, at a CTP-H connection step 80. For example, as shown in FIG. 1, nodes N3, N1 and N5 have respective CTP-Hs, which are linked to network 30 by respective connections 34, 36 and 38. The CTP-Hs may be either physical or virtual ports. The activation and deactivation of the CTP-Hs is controlled by the ring network nodes, as described below, in such a manner as to prevent loops in the VPLS. Therefore, connections 34, 36 and 38 may be linked to standard ports of any suitable bridges in external network 30. The use of these inactive, standby hub CTPs, in the manner described herein, consumes minimal bandwidth (as long as the hub CTPs are inactive), in contrast to protection schemes known in the art that are based on duplication of information or squelching according to squelching tables. Furthermore multiple CTP-Hs may be configured to provide a wide variety of N:M protection topologies with added redundancy, and not only 1:1 and 1+1 redundancy as in many systems known in the art.

Each CTP-H is assigned a respective priority, either by the service provider or by automatic setting. Only the CTP-H with the highest priority is activated initially, at a CTP-H activation step 82. All of the other CTP-H connections to network 30 are blocked in order to prevent formation of network loops. In the example shown in FIG. 1, node N3 has the highest priority, so that connection 34 is activated, while connections 36 and 38 are blocked.

Node N3 monitors the status of the active CTP-H, in order to detect possible failures of connection 34, at a failure monitoring step 84. Such a failure may occur, for example, if the physical port used by the CTP-H fails or if there is a corresponding failure in network 30. (Such a failure could be indicated by an Ethernet or tunneling protocol management message, for example, depending on the characteristics of network 30.) Upon detecting the failure, node N3 deactivates its CTP-H and sends a message reporting the failure to the other nodes 24 in the VPLS on ring network 22.

When a node that has a deactivated CTP-H receives the message indicating that the active CTP-H has failed, it checks which of the remaining CTP-H nodes has the next-highest priority. The node with the next-highest priority activates its CTP-H, at a protection activation step 86. Thus, for example, node N1 might activate connection 36, while connection 38 remains deactivated. Full communication with network 30 is thus restored while loop creation is avoided.

When the failure in the highest-priority CTP-H is fixed, node N3 sends a notification to the other nodes in the VPLS on ring network 22 that it is prepared to reopen connection 34, at a reversion step 88. Typically, upon receiving this message, the node (N1) with the currently-active CTP-H immediately disables the CTP-H, thereby deactivating connection 36. Node N3 waits for a predetermined period to allow node N1 to complete the deactivation of its connection, and then enables its own CTP-H to reactivate connection 34.

Alternatively, the nodes in ring network 22 may be provisioned for non-revert operation. In this case, after node N3 has failed-over to node N1, connection 36 will remain active indefinitely. Node N3 will reactivate connection 34 only if connection 36 fails or when the network is reset.

In addition, nodes 24 may determine that ring network 22 has become segmented, at a segmentation detection step 90. Such segmentation may occur as the result of failures in two spans of the ring network, as shown in FIG. 4. The nodes learn of the segmentation by sending and receiving topology messages over the ring network, as at step 64 in FIG. 3. This mechanism also enables the nodes to detect when the node with the currently-active CTP-H (N3 in the present example) has failed, since that node will cease to transmit topology messages to the other nodes. In other words, the failed node effectively "disappears" from the ring topology, as though it had been segmented out of the ring.

When a node that is provisioned with a CTP-H discovers that the ring network has been segmented, the node checks the current topology to determine whether there is another CTP-H active in its own segment of the ring, at an activity checking step 92. If spans S4 and S6 were broken, for example, then node N1 would determine that the CTP-H of node N3 is still active in its own segment of the ring. Node N1 would therefore take no further action in this case. Node N5, on the other hand, would determine that there is no active CTP-H remaining in its segment of the ring. Node N5 then determines that there is no other CTP-H with higher priority in its segment, and therefore activates connection 38 at step 86.

When the segmentation of ring network 22 is resolved, the resulting topology messages indicate to node N5 that there is now another CTP-H (at node N3) with higher priority in its segment of the ring. As a result, node N5 immediately disables its own CTP-H at step 88.

Although the embodiments described hereinabove are based on RPR network 22 and nodes 24 that are specifically designed to support VPLS over RPR, the principles of the present invention may similarly be applied in provisioning and protection of other sorts of virtual private networks, operating over bi-directional packet rings of any suitable type. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication over a bi-directional ring network that includes nodes connected by spans of the ring network, the method comprising:
    provisioning a virtual private local area network service (VPLS) to serve users over the bi-directional ring network, the VPLS comprising connection termination points provisioned respectively on a plurality of the nodes so as to connect each of the plurality of the nodes to a second network external to the ring network;
    activating a selected connection termination point, to establish a connection between the bi-directional ring network and the second network;
    as long as the nodes and spans are fully operational, maintaining all of the connection termination points except the selected connection termination point in a deactivated state, so that only the selected connection termination point to the second network is active;
    exchanging messages among the nodes indicative of:
        a failure in at least two spans of the ring network causing a segmentation of the ring network and leading to an isolation of a first node of the ring network from at least one second node of the ring network; and
    responsively to the messages, activating at least one of the deactivated connection termination points so as to overcome the segmentation and maintain connectivity of the first node with the at least one second node of the ring network, without creating a loop in the VPLS via the second network.

2. The method according to claim 1, wherein the bi-directional ring network comprises a resilient packet ring (RPR) network, and wherein exchanging the messages comprises transmitting and receiving RPR topology messages.

3. The method according to claim 1, wherein the connection termination points are provisioned as virtual users of the VPLS.

4. The method according to claim 3, wherein provisioning the VPLS comprises provisioning multiple VPLS instances over the bi-directional ring network, each of the VPLS instances comprising respective connection termination points, and wherein activating the at least one of the deactivated connection termination points comprises activating the respective connection termination points in each of the VPLS instances that is affected by the failure.

5. The method according to claim 1, wherein exchanging the messages comprises determining that the ring network has become segmented into at least first and second separate segments, and wherein activating the at least one of the deactivated connection termination points comprises activating one or more of the deactivated connection termination points so that at least one of the connection termination points is active in each of the first and second segments, whereby both of the first and second segments are connected to the second network.

6. The method according to claim 5, wherein activating the one or more of the deactivated connection termination points comprises activating first and second connection termination points in the first and second segments, respectively, so as to connect the first and second segments via a path through the second network.

7. The method according to claim 1, wherein provisioning the VPLS comprises designating a node in the bi-directional ring network to serve as a hub, and activating a connection termination point of the designated node to connect the VPLS on the nodes of the ring network to the second network as long as the nodes and spans are fully operational, and
    wherein exchanging the messages comprises detecting and reporting on a failure of the activated connection termination point of the designated node, and wherein activating the at least one of the deactivated connection termination points comprises activating one of the deactivated connection termination points of another node in the ring network so that the other node serves as the hub connecting the VPLS on the nodes of the ring network to the second network.

8. The method according to claim 1, wherein activating the at least one of the deactivated connection termination points comprises assigning respective priorities to the nodes, and choosing which of the connection termination points to activate responsively to the priorities.

9. The method according to claim 1, wherein activating the at least one of the deactivated connection termination points comprises determining, based on the messages, a topology of the ring network subject to the failure, and choosing which of the connection termination points to activate responsively to the topology.

10. The method according to claim 1, and comprising exchanging further messages indicative that the failure has been rectified, and responsively to the further messages, deactivating the at least one of the connection termination points that had activated responsively to the messages that were indicative of the failure.

11. A system for communication, comprising nodes connected by spans so as to define a bi-directional ring network, over which a virtual private local area network service (VPLS) is provisioned to serve users, the VPLS comprising connection termination points provisioned respectively on a plurality of the nodes so as to connect each of the plurality of the nodes to a second network external to the ring network, with a connection established between the bi-directional ring network and the second network via a selected connection termination point in an activated state, wherein as long as the nodes and spans are fully operational, all of the connection termination points except the selected connection termination point are maintained in a deactivated state, so that only the selected connection termination point to the second network is active, and wherein the nodes are arranged to exchange messages indicative of:

a failure in at least two spans of the ring network causing a segmentation of the ring network and leading to an isolation of a first node of the ring network from at least one second node of the ring network; and responsively to the messages, to activate at least one of the deactivated connection termination points so as to overcome the segmentation and maintain connectivity of the first node with the at least one second node of the ring network, without creating a loop in the VPLS via the second network.

12. The system according to claim 11, wherein the bi-directional ring network comprises a resilient packet ring (RPR) network, and wherein the messages comprise RPR topology messages.

13. The system according to claim 11, wherein the connection termination points are provisioned as virtual users of the VPLS.

14. The system according to claim 13, wherein multiple VPLS instances are provisioned over the bi-directional ring network, each of the VPLS instances comprising respective connection termination points, and wherein the respective connection termination points are activated in each of the VPLS instances that is affected by the failure.

15. The system according to claim 11, wherein the nodes are operative to determine, responsively to the messages, that the ring network has become segmented into at least first and second separate segments, and to activate one or more of the deactivated connection termination points so that at least one of the connection termination points is active in each of the first and second segments, whereby both of the first and second segments are connected to the second network.

16. The system according to claim 15, wherein the nodes are adapted to activate first and second connection termination points in the first and second segments, respectively, so as to connect the first and second segments via a path through the second network.

17. The system according to claim 11, wherein a node in the bi-directional ring network is designated to serve as a hub, such that a connection termination point of the designated node is activated to connect the VPLS on the nodes of the ring network to the second network as long as the nodes and spans are fully operational, and wherein the nodes are arranged so that the designated node detects and reports to the nodes on a failure of the activated connection termination point, causing one of the deactivated connection termination points of another node in the ring network to be activated so that the other node serves as the hub connecting the VPLS on the nodes of the ring network to the second network.

18. The system according to claim 11, wherein the nodes are assigned respective priorities and are operative to choose which of the connection termination points to activate responsively to the priorities.

19. The system according to claim 11, wherein the nodes are operative to determine, based on the messages, a topology of the ring network subject to the failure, and to choose which of the connection termination points to activate responsively to the topology.

20. The system according to claim 11, wherein the nodes are arranged to exchange further messages indicative that the failure has been rectified, and responsively to the further messages, to deactivate the at least one of the connection termination points that had activated responsively to the messages that were indicative of the failure.

\* \* \* \* \*